United States Patent
Buhler et al.

(10) Patent No.: US 11,957,089 B2
(45) Date of Patent: *Apr. 16, 2024

(54) ZERO LEAK PILOT OPERATED VALVE HAVING TWO SEATS

(71) Applicant: AUSCO, INC., Port Washington, NY (US)

(72) Inventors: Werner Buhler, Woodside, NY (US); Kenneth Bram, Huntington, NY (US)

(73) Assignee: AUSCO, INC., Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,734

(22) Filed: Oct. 26, 2020

(65) Prior Publication Data

US 2021/0251152 A1    Aug. 19, 2021

Related U.S. Application Data

(63) Continuation of application No. 12/399,695, filed on Mar. 6, 2009, now Pat. No. 10,813,296.

(60) Provisional application No. 61/034,384, filed on Mar. 6, 2008.

(51) Int. Cl.
*F16K 31/383* (2006.01)
*A01G 7/02* (2006.01)
*A01G 13/06* (2006.01)
*F16K 3/26* (2006.01)

(52) U.S. Cl.
CPC ............... *A01G 7/02* (2013.01); *A01G 13/06* (2013.01); *F16K 3/267* (2013.01); *F16K 31/383* (2013.01)

(58) Field of Classification Search
CPC ..... B05B 15/622; B05B 15/68; B05B 15/625; F16K 3/267; F16K 31/383; A01G 7/02
USPC ........................................................ 137/490
See application file for complete search history.

(56) References Cited

U.S. PATENT DOCUMENTS

| | | | | |
|---|---|---|---|---|
| 3,215,236 A | * | 11/1965 | Pensa ...................... | F16D 25/12 |
| | | | | 137/489.5 |
| 3,294,111 A | | 12/1966 | Abercrombie et al. | |
| 3,341,210 A | | 9/1967 | Vick | |
| 3,414,006 A | * | 12/1968 | Feroy ...................... | F16K 17/10 |
| | | | | 137/494 |
| 4,742,846 A | * | 5/1988 | DiBartolo ............. | F16K 17/065 |
| | | | | 137/469 |

(Continued)

OTHER PUBLICATIONS https://www.wordnik.com/words/valve-seat, Nov. 24, 2014, Wordnik.

*Primary Examiner* — Chee-Chong Lee
(74) *Attorney, Agent, or Firm* — F. CHAU & ASSOCIATES, LLC

(57) ABSTRACT

A valve includes an inlet and an outlet; a body including a first seat and a second seat; a cavity in the body; a piston positioned in the cavity; and a pilot ball adjacent the piston and that is disposed in a pilot seat, and a rear surface of the piston butts against the pilot seat at a maximum open position of the piston. Each of the first seat and the second seat is a seat that is a mechanical stop that prevents the piston from extending further than the closed position. The piston includes a flat front face that contacts the first seat when in the closed position, and a nose extension that extends outward and away from a center portion of the front face, and the nose extension has an opening through a center of a front surface thereof.

14 Claims, 3 Drawing Sheets

(56) References Cited

U.S. PATENT DOCUMENTS

| | | | |
|---|---|---|---|
| 5,050,636 A * | 9/1991 | Sagawa | F16K 17/0433 |
| | | | 137/494 |
| 5,381,823 A | 1/1995 | DiBartolo | |
| 5,875,815 A | 3/1999 | Ungerecht et al. | |
| 6,039,070 A | 3/2000 | Zaehe | |
| 6,119,722 A | 9/2000 | Zaehe | |
| 7,069,945 B2 | 7/2006 | Slawinski et al. | |
| 2013/0306166 A1 * | 11/2013 | Erb | F16K 17/065 |
| | | | 137/469 |

* cited by examiner

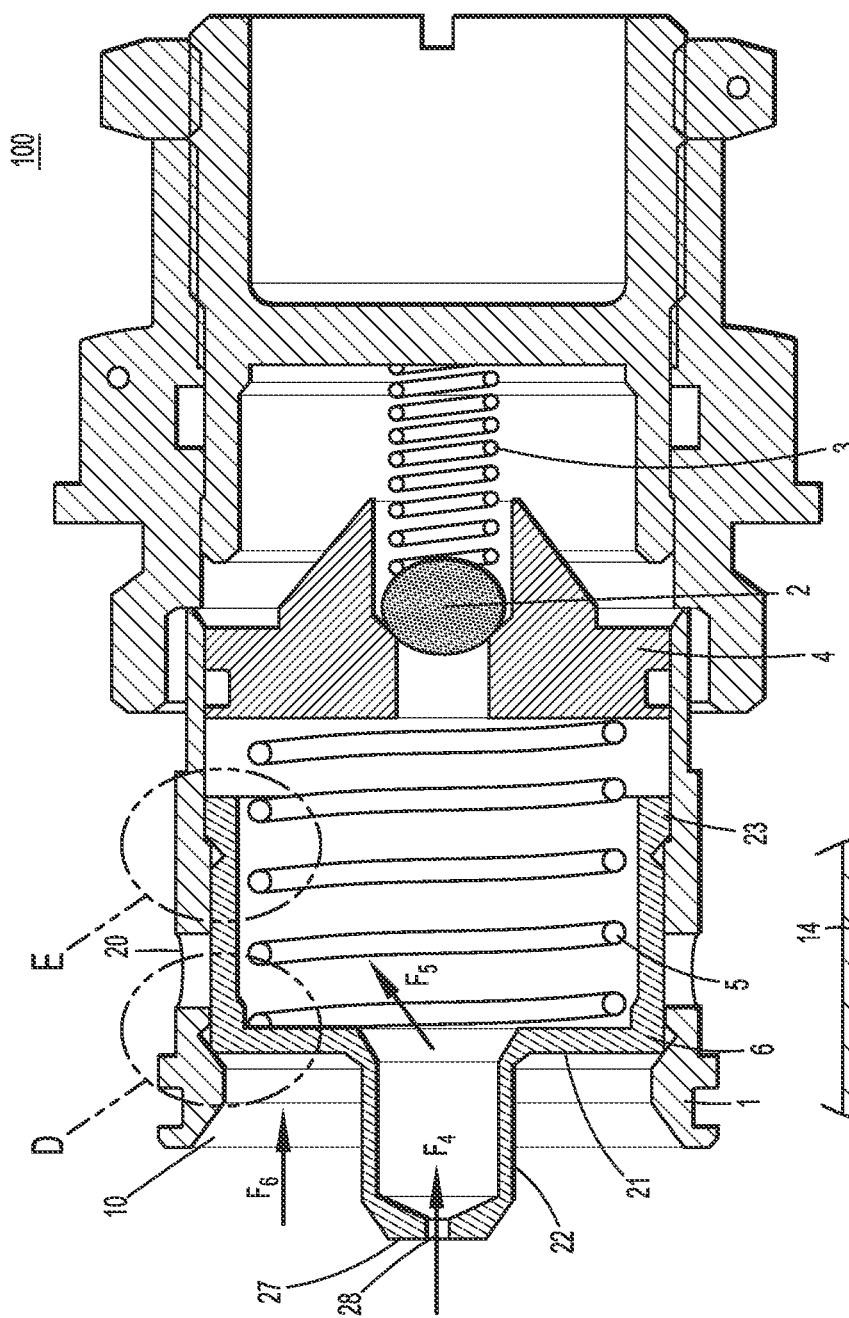

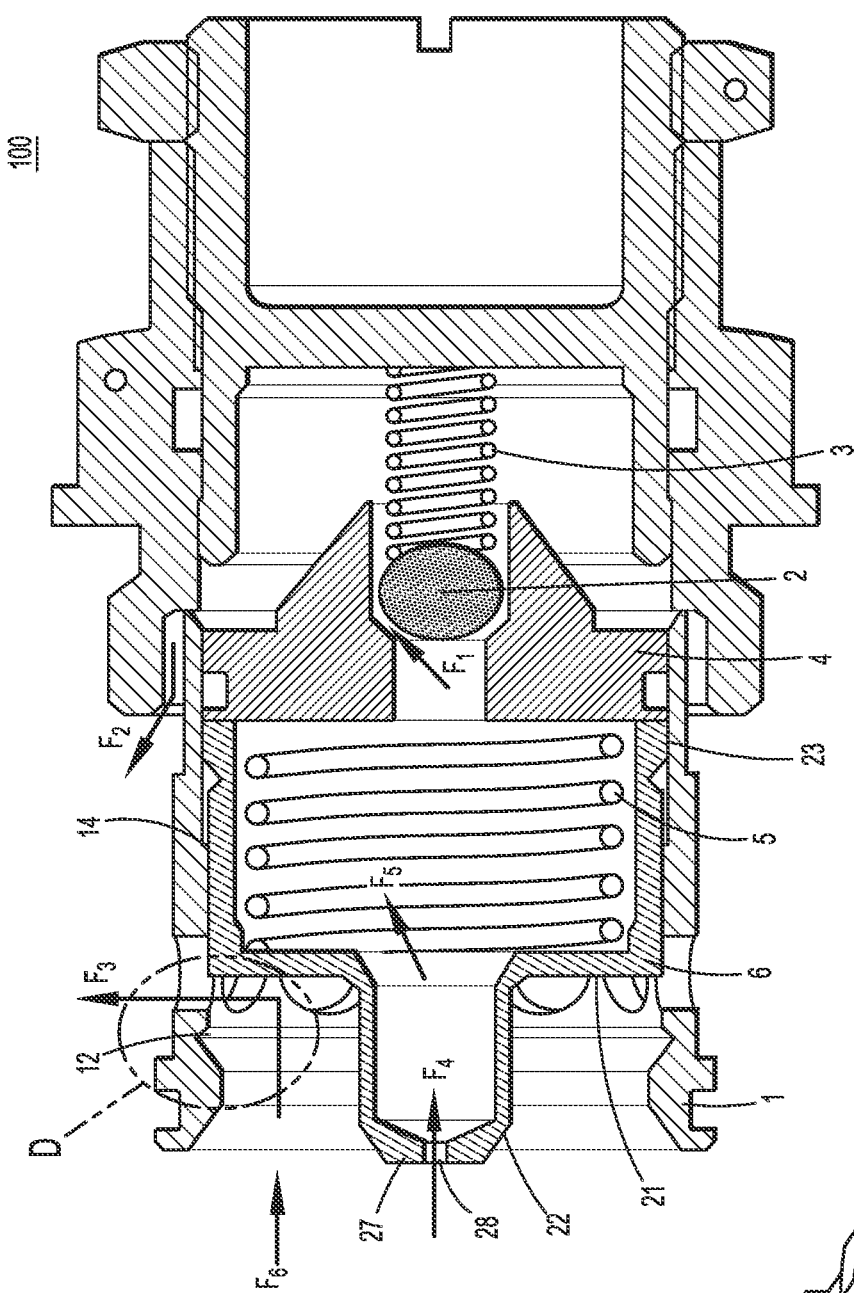
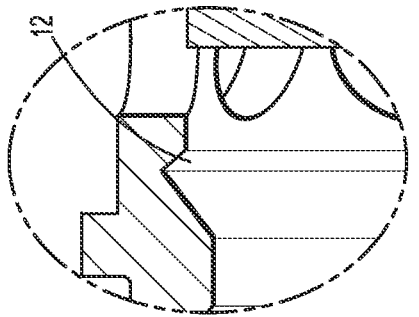
FIG. 3B
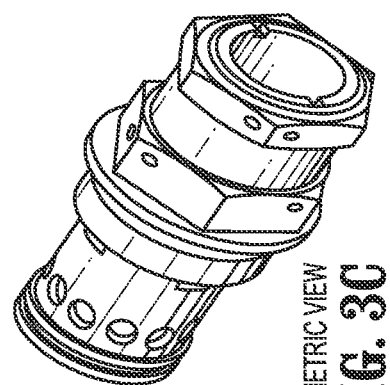
FIG. 3C

ZERO LEAK PILOT OPERATED VALVE HAVING TWO SEATS

CROSS-REFERENCE TO RELATED APPLICATION

This application is a continuation of U.S. application Ser. No. 12/399,695, filed on Mar. 6, 2009 in the U.S. Patent and Trademark Office, which claims the benefit of U.S. Provisional Patent Application Ser. No. 61/034,384, filed on Mar. 6, 2008, the contents of both of which are herein incorporated by reference in their entirety.

BACKGROUND OF THE INVENTION

1. Technical Field

The present disclosure relates to a pilot operated valve design which limits leakage from inlet to outlet in a hydraulic system.

2. Discussion of the Related Art

Many hydraulic systems can not afford any leakage to outlet ports when the valve is closed. In addition, pilot operated valves may be desirable in certain types of systems.

Conventional pilot operated valve designs have leakage to the outlet port, for example, from the inlet port to the outlet port, when the valve is closed. Conventional solutions to this problem include replacing the pilot operated valves with direct acting designs, which undesirably increases the size and weight of a device.

Accordingly, there is a need for a pilot operated valve design that has no leakage to the outlet port when the valve is closed, hence improving packaging and keeping the size smaller than direct acting check or relief valves.

SUMMARY OF THE INVENTION

The embodiments of this invention eliminate hydraulic leakage to an output port in pilot operated valves, while still keeping the advantages of a pilot operated valve. The embodiments of the present invention may be applied to, for example, pilot operated check valves and pilot operated relief valves.

A valve, according to an embodiment of the present invention, comprises an inlet and an outlet, a body including a first seat and a second seat, wherein the first seat and second seat are spaced apart from each other at a predetermined distance, a cavity in the body, a piston positioned in the cavity, wherein the piston rests against the first seat and the second seat when in the closed position, and a pilot ball or poppet adjacent or in the piston.

The inlet may be positioned in a first side of the body and the outlet may be positioned in a second side of the body, the second side being substantially perpendicular to the first side.

The first seat may be positioned on a first side with respect to the outlet and the second seat may be positioned on a second side with respect to the outlet, the first side being closer to the inlet than the second side.

A spring may bear against the piston to maintain the piston in the closed position.

A spring may bear against the pilot ball or poppet to maintain the pilot ball or poppet in the closed position.

A method for preventing leakage in a pilot-operated valve, according to an embodiment of the present invention, comprises positioning a piston in a cavity of a valve body, resting the piston against a first seat and a second seat of the body when in the closed position, wherein the first seat and second seat are spaced apart from each other at a predetermined distance, and positioning a pilot ball or poppet adjacent or in the piston.

The valve may include an inlet positioned in a first side of the body and an outlet positioned in a second side of the body, the second side being substantially perpendicular to the first side.

The method may further comprise positioning the first seat on a first side with respect to the outlet, and positioning the second seat on a second side with respect to the outlet, the first side being closer to the inlet than the second side.

BRIEF DESCRIPTION OF THE DRAWINGS

Exemplary embodiments of the present invention will be described below in more detail, with reference to the accompanying drawings, of which:

FIG. 2A is a cross-sectional view of the valve showing fluid flow into the valve, wherein the valve is in the closed position, according to an embodiment of the present invention;

FIGS. 2B and 2C are close-up views of portions D and E of FIG. 2A;

FIG. 2D is an isometric view of the valve, according to an embodiment of the present invention;

FIG. 3A is a cross-sectional view of the valve, wherein the valve is in the open position, according to an embodiment of the present invention;

FIG. 3B is a close-up view of portion D of FIG. 3A; and

FIG. 3C is an isometric view of the valve, according to an embodiment of the present invention.

DETAILED DESCRIPTION OF EXEMPLARY EMBODIMENTS

Figure 1A:
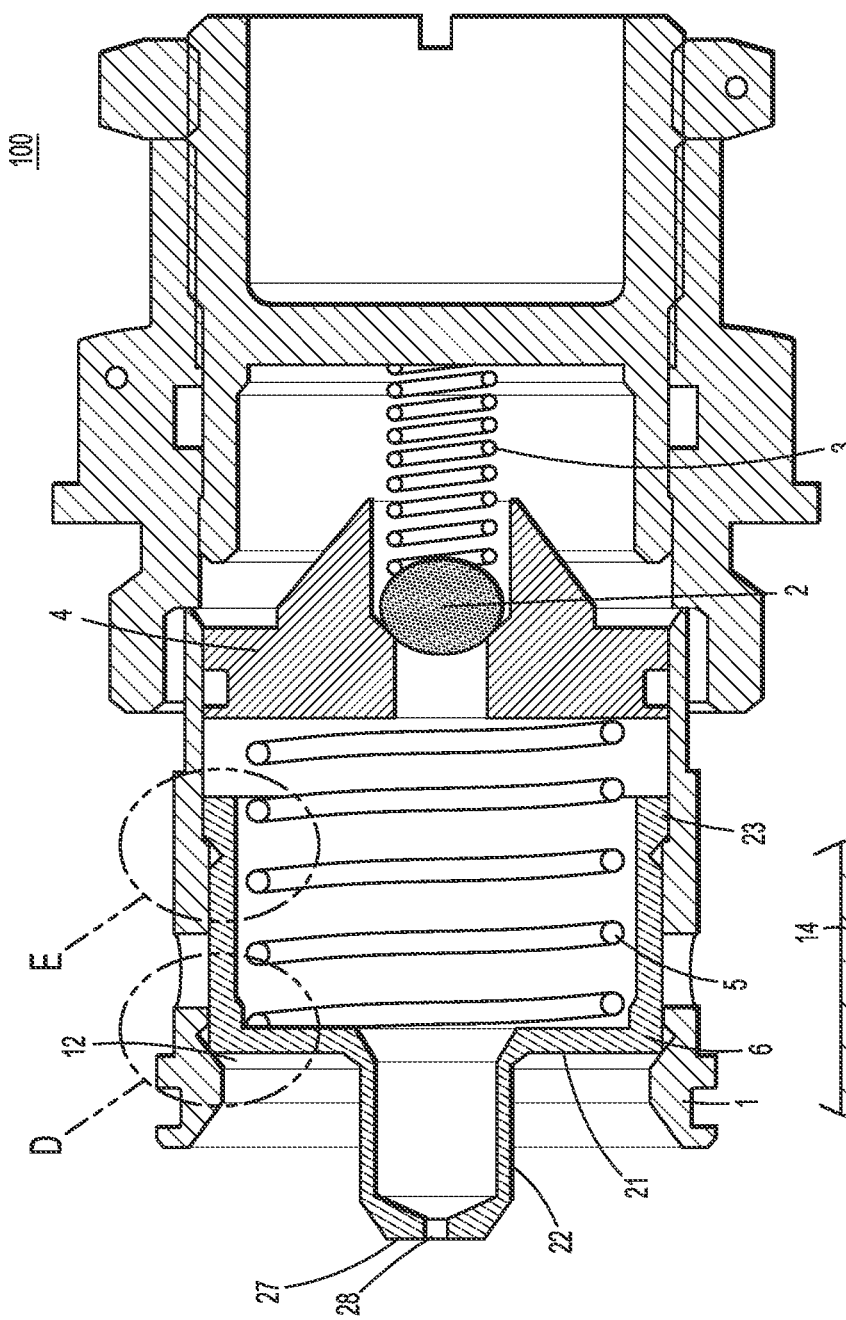
FIG. 1A is a cross-sectional view of the valve, wherein the valve is in the closed position, according to an embodiment of the present invention.
Figure 1C:
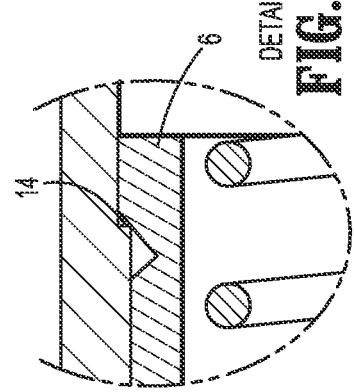
FIGS. 1B and 1C are close-up views of portions D and E of FIG. 1A.
Figure 1B:
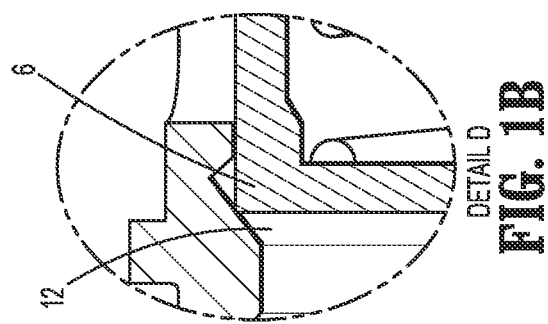
Figure 1D:
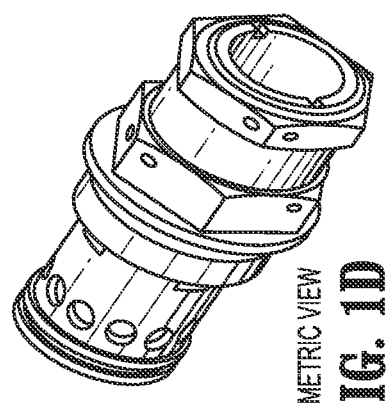
FIG. 1D is an isometric view of the valve, according to an embodiment of the present invention.

Exemplary embodiments of the present invention now will be described more fully hereinafter with reference to the accompanying drawings. This invention may, however, be embodied in many different forms and should not be construed as limited to the embodiments set forth herein.

Referring to FIGS. 1A-1D, 2A-2D and 3A-3C, to eliminate leakage from an inlet 10 to an outlet port 20 when the valve 100 is closed, two seats 12 and 14 are incorporated in the body 1 for the piston 6 to rest against. As inlet pressure increases, the piston 6 stays closed due to force balance, whereby the force on the piston 6 is less than the force on spring 5 bearing against piston 6, and no leakage is observed at outlet port 20. The spring 5 provides a force on the piston 6 to maintain the piston 6 in the closed position. As the pilot ball or poppet 2 is urged open by the increasing inlet pressure overcoming the opposing force of the poppet spring 3, a differential pressure is created, whereby the pressure to the right of the piston 6 (away from the inlet 10) is less than the pressure to the left of the piston 6 (near the inlet 10). This pressure differential overcomes the force of the piston spring 5, the piston 6 unseats and starts opening. Fluid is then flowing from inlet 10 to outlet ports 20, as shown by arrow $F_3$.

As can be seen in FIGS. 1A, 2A, and 3A, the piston 6 includes a front face 21 that contacts the first seat 12 when in the closed position, and a nose extension 22 that extends outward from the front face 21. The nose extension 22 has an opening 28 that extends through a flat front surface thereof 27 through which fluid can enter into the valve, as indicted by arrows $F_4$ and $F_5$ in FIGS. 2A and 3A. A side surface 23 of the piston 6 perpendicular to the rear surface and closer to the pilot seat 4 than the second seat 14 butts against the body 1.

FIGS. 1A, 2A and 3A are axial views of a pilot operated valve incorporating the embodiments of the present invention. The direction of flow into, through and out of the valve is shown by the arrows $F_4$, $F_5$, and $F_6$ in FIGS. 2A and 3A.

The pilot operated valve may be, for example, a relief valve, a check valve or a solenoid valve. In other words, the valve general function is: 1) to regulate the pressure in a hydraulic system by alternately opening and closing to release excess fluid to limit the maximum system pressure (relief valve); 2) to allow flow in only one direction in a hydraulic system (check valve); or 3) to allow flow in one direction in a hydraulic system when a signal command is applied (solenoid valve). The use of the pilot ball or poppet allows the check, relief or solenoid valves to be in a smaller package than a direct acting valve.

Referring to FIGS. 1A and 2A, when pressure that is small enough to keep the valve closed (i.e., not large enough to overcome the force of piston spring 5) is applied to the inlet 10 of the valve 100, the piston 6 remains rested against the two seats 12 and 14 of the body 1, preventing any hydraulic leakage to the outlet port 20. Referring to FIG. 3A, when the pressure acting on the pilot seat 4 area exceeds the opposing pilot spring 3 force, the pilot ball or poppet 2 moves to the right, opening up the seat 4 for fluid to flow out of the pilot cavity and the valve 100, as shown by arrows $F_1$ and $F_2$. A differential pressure is then created across the piston 6, which starts to move away from its two seats 12, 14, allowing more fluid to flow through the valve 100, as shown by arrow $F_3$.

Incorporating the two seats 12, 14 for the piston 6 to rest against prevents leakage, and, therefore, allows the use of a pilot operated valve 100 for zero leak applications, while minimizing the valve size. However, in conventional designs, there are no such seats in the body of a pilot operated valve, and just a retaining ring to hold the piston inside the valve.

Although exemplary embodiments of the present invention have been described hereinabove, it should be understood that the present invention is not limited to these embodiments, but may be modified by those skilled in the an without departing from the spirit and scope of the present invention.

What is claimed is:

1. A valve, comprising:
  an inlet and an outlet;
  a body including a first seat and a second seat, wherein the first seat and second seat are spaced apart from each other at a predetermined distance without a seal between the first and second seats;
  a cavity in the body;
  a piston positioned in the cavity, wherein the piston simultaneously contacts and rests against the first seat and the second seat when moving into a closed position, wherein the piston includes a flat front face that contacts the first seat when in the closed position, and a nose extension that extends outward and away from a center portion of the front face and toward the inlet, wherein the nose extension includes a flat front surface and an opening through a center of the flat front surface thereof; and
  a pilot ball adjacent the piston, wherein the pilot ball is disposed in a pilot seat, and a rear surface of the piston butts against the pilot seat at a maximum open position of the piston,
  wherein each of the first seat and the second seat is a seat that is a mechanical stop that prevents the piston from extending further than the closed position.

2. The valve according to claim 1, wherein the inlet is positioned in a first side of the body and the outlet is positioned in a second side of the body, the second side being substantially perpendicular to the first side.

3. The valve according to claim 2, wherein the first seat is positioned on the first side with respect to the outlet and the second seat is positioned on the second side with respect to the outlet, the first side being closer to the inlet than the second side.

4. The valve according to claim 1, further comprising a spring bearing against the piston to maintain the piston in the closed position.

5. The valve according to claim 1, further comprising a spring bearing against the pilot ball to maintain the pilot ball in the closed position.

6. The valve according to claim 1, wherein the pilot ball is in fluid communication with the opening at the center of the front surface of the piston and is downstream therefrom as fluid flows through the valve.

7. The valve according to claim 1, wherein a side surface of the piston perpendicular to the rear surface and closer to the pilot seat than the second seat butts against the body.

8. A method for preventing leakage in a pilot-operated valve, comprising:
  positioning a piston in a cavity of a valve body; wherein the cavity is disposed between an inlet and an outlet;
  moving the piston into a closed position wherein the piston simultaneously contacts and rests against a first seat and a second seat of the body, wherein the first seat and second seat are spaced apart from each other at a predetermined distance without a seal between the first and second seats, wherein the piston includes a flat front face that contacts the first seat when in the closed position, and a nose extension that extends outward and away from a center portion of the front face and toward the inlet, wherein the nose extension includes a flat front surface and an opening through a center of the flat front surface thereof; and
  positioning a pilot ball adjacent the piston, wherein the pilot ball is disposed in a pilot seat, and a rear surface of the piston butts against the pilot seat at a maximum open position of the piston,
  wherein each of the first seat and the second seat is a seat that is a mechanical stop that prevents the piston from extending further than the closed position.

9. The method according to claim 8, wherein the inlet positioned in a first side of the body and the outlet positioned in a second side of the body, the second side being substantially perpendicular to the first side.

10. The method according to claim 9, further comprising:
  positioning the first seat on the first side with respect to the outlet; and positioning the second seat on the second side with respect to the outlet, the first side being closer to the inlet than the second side.

11. The method according to claim 8, wherein a spring bears against the piston to maintain the piston in the closed position.

12. The method according to claim 8, wherein a spring bears against the pilot ball to maintain the pilot ball in the closed position.

13. The method according to claim 8, wherein the pilot ball is in fluid communication with the opening at the center of the front surface of the piston and is downstream therefrom as fluid flows through the valve.

14. The method according to claim 8, wherein a side surface of the piston perpendicular to the rear surface and closer to the pilot seat than the second seat butts against the body.

\* \* \* \* \*